United States Patent
Dell et al.

(10) Patent No.: US 9,336,401 B2
(45) Date of Patent: *May 10, 2016

(54) IMPLEMENTING ENHANCED SECURITY WITH STORING DATA IN DRAMS

(71) Applicant: International Business Machines Corporation, Armonk, NY (US)

(72) Inventors: Timothy J. Dell, Colchester, VT (US); Prasanna Jayaraman, Bangalore (IN); Girisankar Paulraj, Bangalore (IN); Diyanesh Babu C. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/158,992

(22) Filed: Jan. 20, 2014

(65) Prior Publication Data

US 2015/0205730 A1 Jul. 23, 2015

(51) Int. Cl.
*G06F 21/60* (2013.01)
*G06F 11/10* (2006.01)
*G06F 21/78* (2013.01)

(52) U.S. Cl.
CPC .......... *G06F 21/602* (2013.01); *G06F 11/1048* (2013.01); *G06F 21/78* (2013.01); *G06F 2212/1052* (2013.01)

(58) Field of Classification Search
None
See application file for complete search history.

(56) References Cited

U.S. PATENT DOCUMENTS

| | | |
|---|---|---|
| 7,248,530 B2 | 7/2007 | Perner |
| 8,261,159 B1 | 9/2012 | Sommer et al. |
| 8,402,349 B2 | 3/2013 | Lee et al. |
| 2002/0077739 A1* | 6/2002 | Augsburger et al. ......... 701/115 |
| 2002/0184579 A1* | 12/2002 | Alvarez et al. ............... 714/719 |
| 2005/0289435 A1* | 12/2005 | Mulla et al. ................... 714/758 |
| 2006/0107072 A1* | 5/2006 | Umezu et al. ................ 713/193 |
| 2009/0052658 A1 | 2/2009 | Kodama et al. |
| 2011/0035539 A1 | 2/2011 | Honda |
| 2011/0153925 A1 | 6/2011 | Bains et al. |
| 2011/0320915 A1* | 12/2011 | Khan ............................ 714/773 |
| 2013/0173983 A1 | 7/2013 | Chung et al. |

FOREIGN PATENT DOCUMENTS

WO    WO2009088920 A1    7/2009

OTHER PUBLICATIONS

Benini, Luca et al., "Energy-Efficient Data Scrambling on Memory-Processor Interfaces", ISLPED'03, Aug. 25-27, 2003, Seoul, Korea; 2003 ACM.
Brier, Eric et al., "Fast Primitives for Internal Data Scrambling in Tamper Resistant Hardware", Springer-Verlag Berlin Heidelberg 2001.

* cited by examiner

*Primary Examiner* — David Le
(74) *Attorney, Agent, or Firm* — Joan Pennington

(57) ABSTRACT

A method, system and memory controller for implementing enhanced security in a memory subsystem including DRAM in a computer system. A memory includes a register to hold scrambling information transmitted from a memory controller; and scrambling circuitry on the memory to scramble at least one of bank select bits and data bits responsive to the scrambling information in the register.

11 Claims, 8 Drawing Sheets

400

EXAMPLE MODE REGISTER SET (MRS) FORMAT

| MRS | | | | | | | | | | | | | | | |
|-----|-----|-----|-----|-----|-----|-----|-----|-----|-----|-----|-----|-----|-----|-----|-----|
| A15 | A14 | A13 | A12 | A11 | A10 | A9 | A8 | A7 | A6 | A5 | A4 | A3 | A2 | A1 | A0 |
| X | X | X | X | OD2 | OD1 | OD0 | ID2 | ID1 | ID0 | OS2 | OS1 | OS0 | IS2 | IS1 | IS0 |

EXAMPLE BANK SELECTION

| INPUT SIDE BANK SELECTION (BS) | | | |
|---|---|---|---|
| IS2 | IS1 | IS0 | BANKS |
| 0 | 0 | 0 | BANK 0 |
| 0 | 0 | 1 | BANK 1 |
| 0 | 1 | 0 | BANK 2 |
| 0 | 1 | 1 | BANK 3 |
| 1 | 0 | 0 | BANK 4 |
| 1 | 0 | 1 | BANK 5 |
| 1 | 1 | 0 | BANK 6 |
| 1 | 1 | 1 | BANK 7 |

| OUTPUT SIDE BANK SELECTION (BS) | | | |
|---|---|---|---|
| OS2 | OS1 | OS0 | BANKS |
| 0 | 0 | 0 | BANK 0 |
| 0 | 0 | 1 | BANK 1 |
| 0 | 1 | 0 | BANK 2 |
| 0 | 1 | 1 | BANK 3 |
| 1 | 0 | 0 | BANK 4 |
| 1 | 0 | 1 | BANK 5 |
| 1 | 1 | 0 | BANK 6 |
| 1 | 1 | 1 | BANK 7 |

EXAMPLE DATA SELECTION

| INPUT SIDE DATA SELECTION (DS) | | | |
|---|---|---|---|
| ID2 | ID1 | ID0 | DATA BITS |
| 0 | 0 | 0 | DATA BIT 0 |
| 0 | 0 | 1 | DATA BIT 1 |
| 0 | 1 | 0 | DATA BIT 2 |
| 0 | 1 | 1 | DATA BIT 3 |
| 1 | 0 | 0 | DATA BIT 4 |
| 1 | 0 | 1 | DATA BIT 5 |
| 1 | 1 | 0 | DATA BIT 6 |
| 1 | 1 | 1 | DATA BIT 7 |

| OUTPUT SIDE DATA SELECTION (DS) | | | |
|---|---|---|---|
| OD2 | OD1 | OD0 | DATA BITS |
| 0 | 0 | 0 | DATA BIT 0 |
| 0 | 0 | 1 | DATA BIT 1 |
| 0 | 1 | 0 | DATA BIT 2 |
| 0 | 1 | 1 | DATA BIT 3 |
| 1 | 0 | 0 | DATA BIT 4 |
| 1 | 0 | 1 | DATA BIT 5 |
| 1 | 1 | 0 | DATA BIT 6 |
| 1 | 1 | 1 | DATA BIT 7 |

FIG. 4C

IMPLEMENTING ENHANCED SECURITY WITH STORING DATA IN DRAMS

FIELD OF THE INVENTION

The present invention relates generally to the data processing field, and more particularly, relates to a method, system and memory controller for implementing enhanced security in a memory subsystem including Dynamic Random Access Memory (DRAM).

DESCRIPTION OF THE RELATED ART

Data security is an important facet of data storage, and techniques to grab data from volatile storage, for example, DRAMs, can force data security requirements even at a module level, such as a Dual In-line Memory Module (DIMM) level.

For example, DIMMs wrenched or quickly removed from a system and then immediately cooled to a low temperature have been shown to retain their charge on most cells long enough to get them into a DIMM tester, start normal refreshes and accesses, and read the data out.

One way to provide protection is to encrypt the data as it is being stored on the DIMM. While this scheme is practical for the relatively slow access times of hard disk drives (HDDs) or solid state drives (SSDs), it is too much overhead for main memory in a computer system.

A need exists for an effective mechanism having the ability for implementing enhanced security in a memory subsystem including Dynamic Random Access Memory (DRAM).

SUMMARY OF THE INVENTION

Principal aspects of the present invention are to provide a method, system and memory controller for implementing enhanced security in a memory subsystem including Dynamic Random Access Memory (DRAM) in a computer system. Other important aspects of the present invention are to provide such method, system and memory controller substantially without negative effects and that overcome many of the disadvantages of prior art arrangements.

In brief, a method, system and memory controller for implementing enhanced security in a memory subsystem including DRAM in a computer system. An Error Correction Code (ECC) strength is selected in proportion to an importance value for data. A memory includes a register to hold scrambling information transmitted from a memory controller; and scrambling circuitry on the memory to scramble at least one of bank select bits and data bits responsive to the scrambling information in the register.

In accordance with features of the invention, data bits further comprise ECC (Error Checking and Correcting) bits.

In accordance with features of the invention, the register holding the scrambling information is volatile and retains the remapping information only when power is active. When power goes off and come back, the register values are set to default setting which will present one to one mapping of data bit/rank/bank or traditional one to one mapping.

In accordance with features of the invention, mainline read and write operation from controller remains unchanged and therefore presents security at DRAM level. With the write operation, mainline data enters into DRAM and is translated as per the programmed pattern and stored. With read operation from DRAM, rearranged data is translated back into original pattern before being sent to controller.

In accordance with features of the invention, a security level is proportional to the level of data rearrangement programmed by the user or applications catering to their level of data security requirements.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4A, 4B, and 4C illustrate example operations of the memory subsystem of FIG. 2 for implementing enhanced security in accordance with the preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and memory controller are provided for implementing enhanced security in a memory subsystem including DRAM in a computer system.

Figure 1:
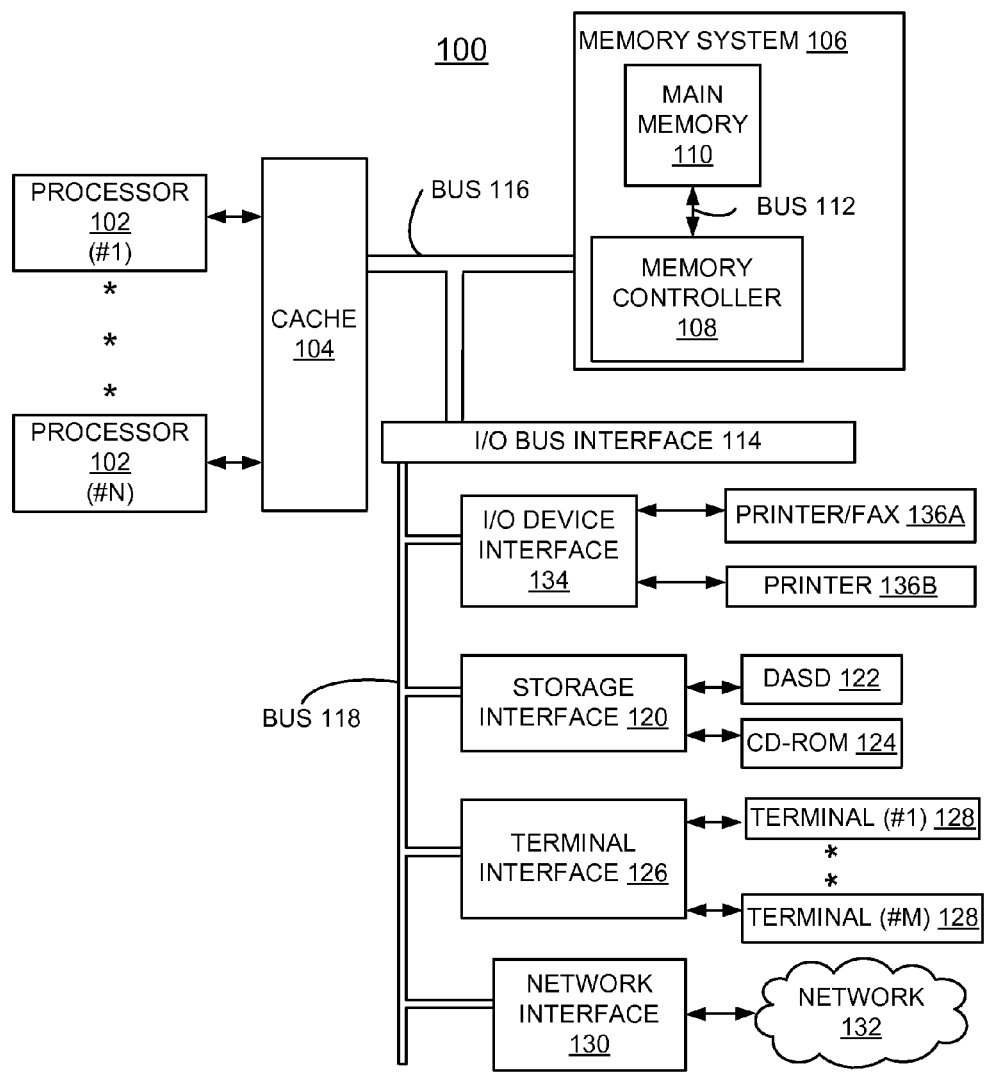
FIG. 1 is a block diagram of an example computer system embodying the present invention.

Having reference now to the drawings, in FIG. 1, there is shown a computer system embodying the present invention generally designated by the reference character 100 for implementing enhanced security in a memory subsystem including DRAM in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. The illustrated computer system 100 is not intended to imply architectural or functional limitations. Although main memory 110 of main memory system 106 is represented conceptually in FIG. 1 as a single entity, it will be understood that in fact the main memory is more complex. In particular, main memory system 106 comprises multiple modules and components. The present invention can be used with various hardware implementations and systems and various other internal hardware devices.

Figure 2:
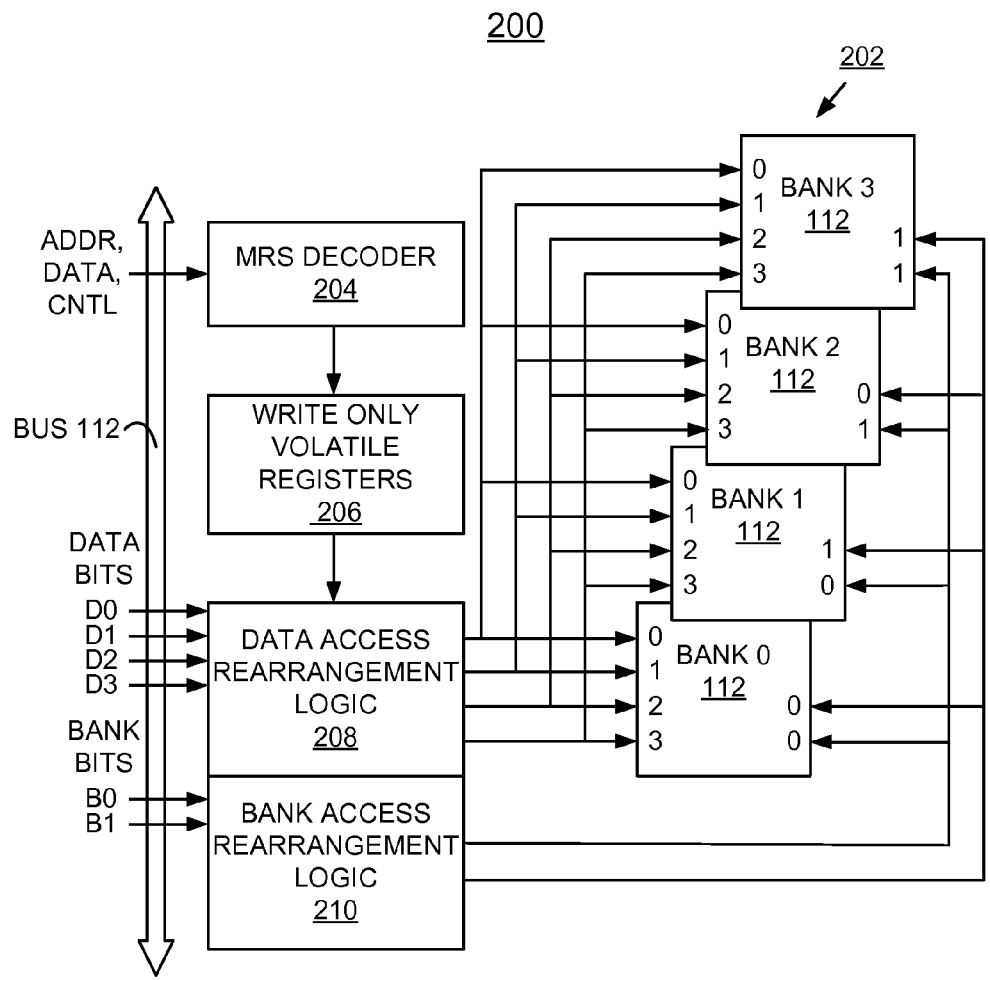
FIG. 2 is a block diagram illustrating an example memory subsystem for implementing enhanced security in the computer system of FIG. 1 in accordance with preferred embodiments.

An example memory subsystem, for example, of the main memory system 106 is illustrated and described with respect to FIG. 2 for implementing enhanced security in accordance with embodiments of the invention.

Referring now to FIG. 2 there is shown an example memory subsystem generally designated by the reference character 200 for implementing enhanced security in the memory system 106 in the computer system 100 in accordance with the preferred embodiment. Memory subsystem 200 includes DRAM generally designated by the reference character 202.

In accordance with features of the invention, in the area of memory subsystem the data security is improved by unique way of storing data in memory subsystem DRAMs. Data is rearranged and stored the data within a DRAM device. Data rearrangement is enabled at data bit and/or rank and/or bank levels through data rearrangement logic, which advantageously includes write only programmable registers using mode register set (MRS) commands.

In the memory subsystem 200, a mode register set (MRS) decoder 204 receives address, data and control, for example from the controller 108 via the bus 112 shown in FIG. 1. Memory subsystem 200 includes write only volatile registers 206 coupled to the MRS decoder 204. Memory subsystem 200 includes data access rearrangement logic 208 and bank access rearrangement logic 210 coupled to the write only volatile registers 206 and each of a plurality of DRAM banks 112, 0-3.

In accordance with features of the invention, the registers 206 holding the scrambling information is volatile and retains the remapping information only when power is active. When power goes off and come back, the register values are set to default setting, which fore example will present one to one mapping of data bit/rank/bank or traditional one to one mapping.

In accordance with features of the invention, mainline read and write operation from controller 108 remains unchanged and therefore presents security at DRAM level. With the write operation, mainline data enters into DRAM memory subsystem 200 and is translated as per the programmed pattern and stored in DRAM banks 112, 0-3. With read operation from DRAM banks 112, 0-3, rearranged data is translated back into original pattern before being sent to controller 108.

Figure 3:
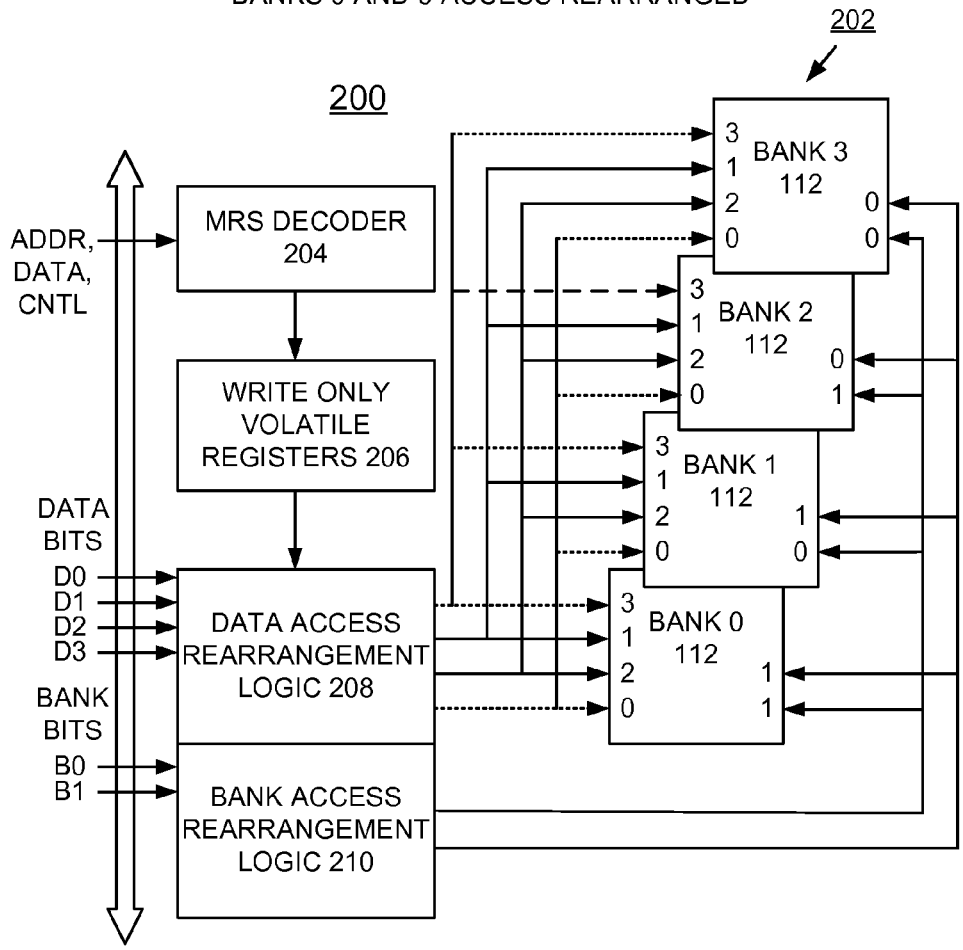
FIG. 3 illustrates example operations of the memory subsystem of FIG. 2 for implementing enhanced security in accordance with the preferred embodiments.

Referring also to FIG. 3, example operation generally designated by the reference character 300 of the memory subsystem 200 is shown for implementing enhanced security in accordance with the preferred embodiments. In the example operation 300, data bits 0 and 3 are rearranged across all DRAM banks 112, 0-3, as indicated in dotted line from the data access rearrangement logic 208. Bank access rearrangement logic 210 provides access rearranged for banks 112, 0 and 3, as indicated by the bank input 11 for bank 112, 0 and by the bank input 00 for bank 112, 3.

Referring also to FIGS. 4A, 4B, and 4C, there are shown example features of the memory subsystem 200 of FIG. 2 for implementing enhanced security in accordance with the preferred embodiments.

In FIG. 4A, an example mode register set (MRS) format generally designated by the reference character 400 is shown. The MRS format 400 includes a plurality of fields A0-A15. As shown, fields A0-A12 of the MRS formal 400 used for implementing enhanced security in accordance with the preferred embodiments.

In FIG. 4B, an example bank selection generally designated by the reference character 410 is shown that includes input side bank selection (BS) inputs IS0, IS1, and IS2 and output side bank selection (BS) inputs OS0, OS1, and OS2 with example values for a plurality of DRAM banks 0-7.

In FIG. 4C, an example data selection generally designated by the reference character 420 is shown, that includes input side data selection (DS) inputs ID0, ID1, and ID2 and output side data selection (DS) inputs OS0, OS1, and OS2 with example values for a plurality of DRAM data bits 0-7.

In accordance with features of the invention, the data bits include ECC (Error Checking and Correcting) bits. If data is scrambled and there is no parity or ECC involved, then it is impossible for the data to be reassembled into its pre-scrambled order by mathematical means from the point of view of the hacker who has stolen the DIMM and attempting to recover the data. However, without parity or ECC, any random, single bit flip will corrupt the data and cause a data integrity issue for the user (also known in the industry as Silent Data Corruption (SDC), because the bad data is taken as good). Since the likelihood of a least a single bit flip occurring in large amounts of memory is relatively high, all servers and enterprise-class computing systems implement an Error Correcting Code (ECC) to protect data in main memory. This is standard practice. For example, a typical code today for an 8-byte (64-bit) memory interface has 8 check-bits and provides single error correction with double error detection (SEC/DED). Furthermore, as is known in the art, the strength, or correcting capability, of the ECC can be changed by using more sophisticated error correcting codes and, especially, by adding to the number of checkbits that are stored.

A resulting dilemma is that important data needs to be protected by a strong ECC to prevent SDC, but the stronger the ECC, the easier it is to correctly reassemble the scrambled data. The scenario is that the hacker will read out the stolen data and assume it is scrambled, and then run it through the ECC algorithm. If the ECC says the data is bad, then the hacker goes on to try another scramble pattern. If the ECC says the data is correct, there are two possibilities. Either the data indeed is correct, in which case the hacker has recovered the data, or the ECC has been overwhelmed by finding so many errors and thus falsely indicates good or correctable data.

In accordance with features of the invention, an Error Correction Code (ECC) strength is selectively decreased in proportion to an importance value for data. In order to keep the hacker from having confidence that he has correctly descrambled the data, the ECC coverage or ECC strength is reduced, which counter-intuitively increases the protection of the data from hackers. Below is an example table 1 of how adding check-bits to a 64-bit data word increases the ECC coverage, but decreases the protection against hackers by allowing higher confidence in their ability to descramble the data.

TABLE 1

| # checkbits | % miscorrected | % confidence |
| --- | --- | --- |
| 8 | 28 | 72 |
| 9 | 14 | 86 |
| 10 | 7 | 93 |
| 11 | 4 | 96 |
| 12 | 2 | 98 |

So for a standard 64-bit ECC with 8 checkbits, there is a 28% chance of falsely saying the data is good. However, by adding 4 checkbits, it drops down to 2%. The confidence of the hacker will go up commensurately.

Figure 5:
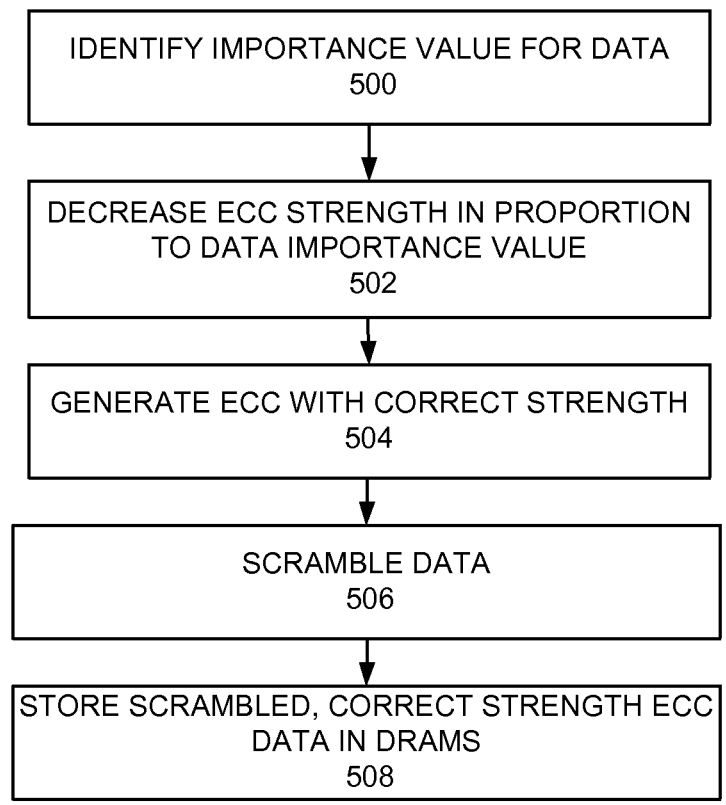
FIG. 5 is a flow chart illustrating example operations of the memory subsystem of FIG. 2 for implementing enhanced security in accordance with the preferred embodiments.

Referring also to FIG. 5, there are shown example operations of the memory subsystem 200 for implementing enhanced security in accordance with the preferred embodiments. Initially an importance value is identified or how valuable the data is decided as indicated in a block 500. An ECC strength is decreased in proportion to the value-ability or importance value of the data as indicated in a block 502. ECC for the data is generated with the correct strength as indicated in a block 504. The data is scrambled as indicated in a block 506. The scrambled, correct-strength ECC data is stored in the DRAMs as indicated in a block 508.

In accordance with features of the invention, a security level is proportional to the level of data rearrangement programmed by the user or applications catering to their level of data security requirements. For example, with 4 data bit, 4 bank DRAM and eight DRAMs in a rank enable 4608 possible combination, which equals 24 data bit combination×24 bank combination and 8 DRAMs. For example, 24 possible combinations for data re-arrangement include:
{D0,D1,D2,D3} {D0,D1,D3,D2} {D0,D2,D1,D3} {D0,D2,D3,D1} {D0,D3,D1,D2} {D0,D3,D2,D1} {D1,D0,D2,D3} {D1,D0,D3,D2} {D1,D2,D0,D3} {D1,D2,D3,D0} {D1,D3,D0,D2} {D1,D3,D2,D0} {D2,D0,D1,D3} {D2,D0,D3,D1} {D2,D1,D0,D3} {D2,D1,D3,D0} {D2,D3,D0,D1} {D2,D3,D1,D0} {D3,D0,D1,D2} {D3,D0,D2,D1} {D3,D1,D0,D2} {D3,D1,D2,D0} {D3,D2,D0,D1} {D3,D2,D1,D0}

For example, 24 possible combinations for bank re-arrangement include: {B0,B1,B2,B3} {B0,B1,B3,B2} {B0,B2,B1,B3} {B0,B2,B3,B1} {B0,B3,B1,B2} {B0,B3,B2,B1} {B1,B0,B2,B3} {B1,B0,B3,B2} {B1,B2,B0,B3} {B1,B2,B3,B0} {B1,B3,B0,B2} {B1,B3,B2,B0} {B2,B0,B1,B3} {B2,B0,B3,B1} {B2,B1,B0,B3} {B2,B1,B3,B0} {B2,B3,B0,B1} {B2,B3,B1,B0} {B3,B0,B1,B2} {B3,B0,B2,B1} {B3,B1,B0,B2} {B3,B1,B2,B0} {B3,B2,B0,B1} {B3,B2,B1,B0}

Figure 6:
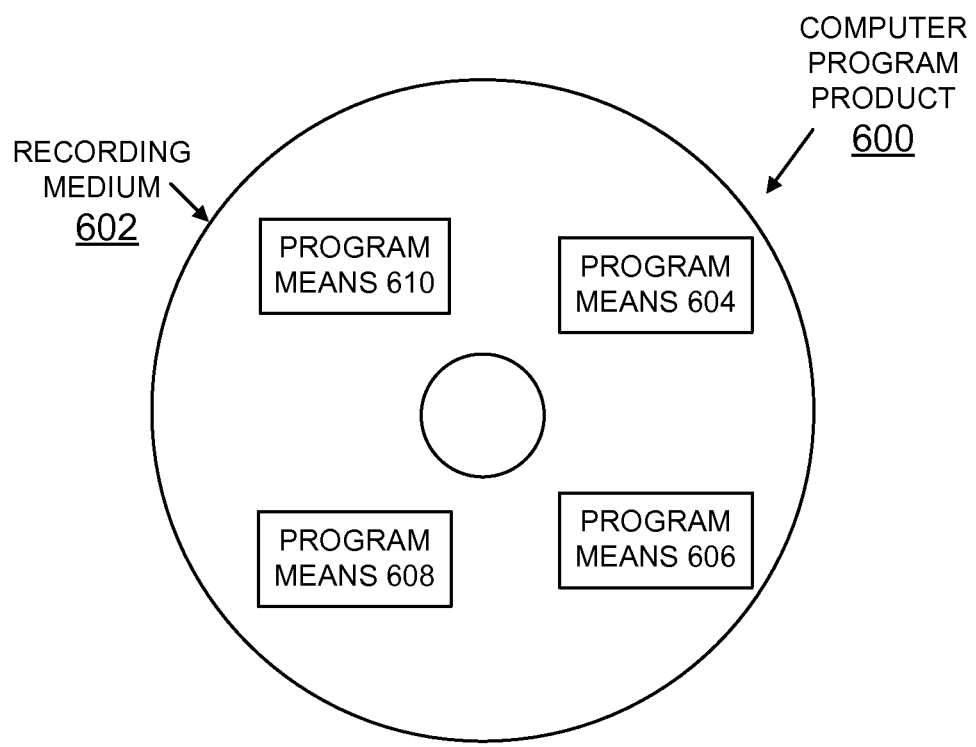
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 606, 606, 608, and 610 on the medium 602 for carrying out the methods for implementing enhanced security in of the preferred embodiment in the system 100 of FIG. 1, and memory subsystem 200 of FIG. 2.

A sequence of program instructions or a logical assembly of one or more interrelated modules defined by the recorded program means 606, 604, 608, and 610, direct the memory controller 108, computer system 100, and memory subsystem 200 for implementing enhanced security of the preferred embodiment.

While the present invention has been described with reference to the details of the embodiments of the invention shown in the drawing, these details are not intended to limit the scope of the invention as claimed in the appended claims.

What is claimed is:

1. A main memory system for implementing enhanced security in a memory subsystem including Dynamic Random Access Memory (DRAM) in a computer system comprising:
   a main memory;
   a memory controller coupled to said main memory,
   said memory subsystem coupled to said memory controller;
   said memory controller identifying an importance value for data;
   said memory controller identifying an Error Checking Code (ECC) strength responsive to said identified importance value for data by decreasing ECC strength in proportion to said identified importance value for data for increasing protection of the data from hackers;
   said memory controller generating ECC for data with said identified ECC strength; and
   said memory subsystem comprising a register to hold scrambling information transmitted from a memory controller when power is active; and scrambling circuitry on the memory subsystem to scramble at least one of bank select bits and data bits responsive to the scrambling information in the register.

2. The system as recited in claim 1 includes control code stored on a computer readable medium, and wherein said memory controller uses said control code to transmit the scrambling information to said memory subsystem.

3. The system as recited in claim 1 wherein mainline read and write operations of said memory controller remains unchanged.

4. The system as recited in claim 1 wherein the data bits further comprise ECC (Error Checking and Correcting) bits generated with the identified ECC strength.

5. The system as recited in claim 1 includes said memory subsystem receiving the normal mainline write from said memory controller, translating and storing write data using the scrambling information.

6. The system as recited in claim 1 includes said memory subsystem receiving the normal mainline read from the memory controller includes translating back read data using the scrambling information before sending the read data to the memory controller.

7. The system as recited in claim 1 wherein said register to hold scrambling information includes a volatile register to hold the scrambling information only when power is active.

8. The system as recited in claim 1 wherein said register storing default settings responsive to the power going off and returns active.

9. The system as recited in claim 8 wherein said default settings includes traditional one to one mapping of bank select bits and data bits.

10. The system as recited in claim 1 wherein said memory controller provides a security level proportional to a level of data rearrangement determined by the scrambling information.

11. The system as recited in claim 10 includes said level of data rearrangement programmed by a user.

\* \* \* \* \*